UNITED STATES PATENT OFFICE.

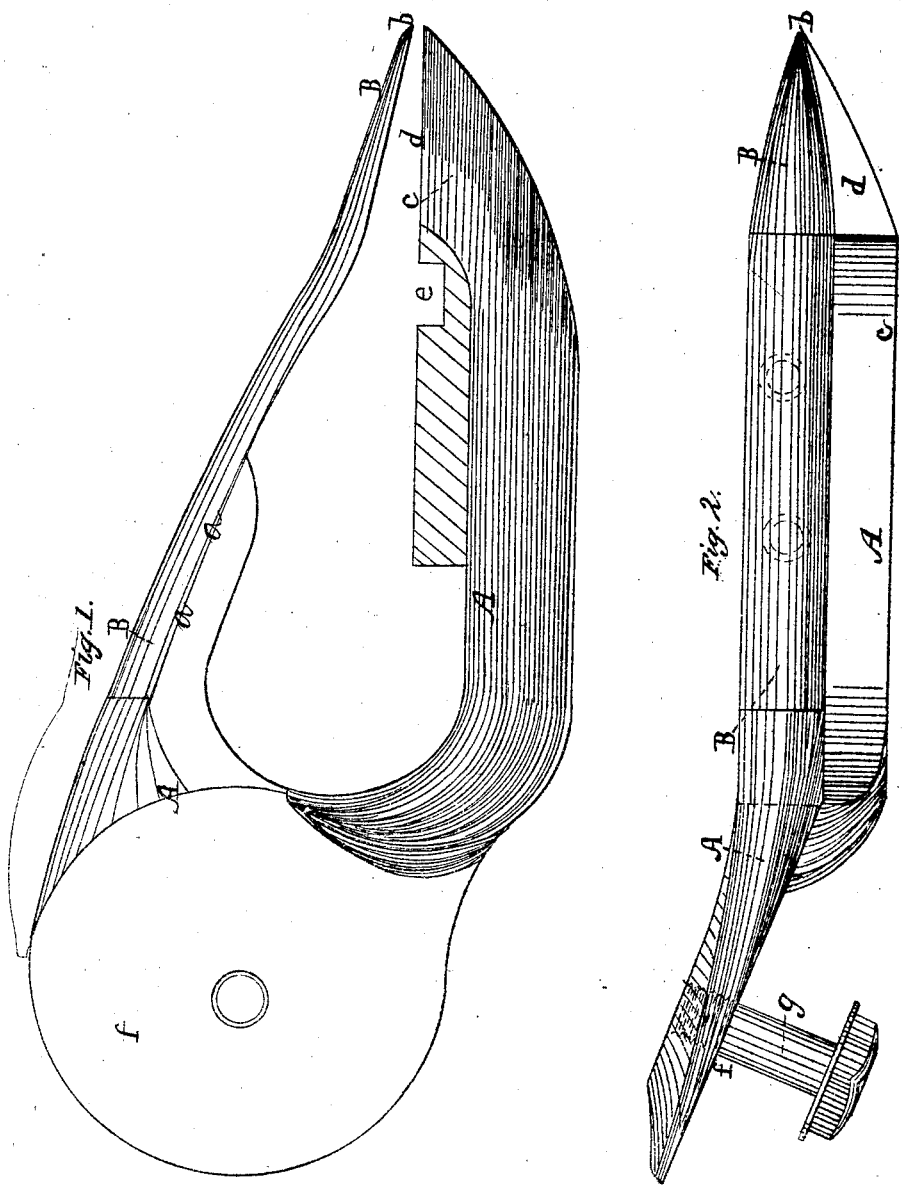

W. A. WOOD, OF HOOSICK FALLS, NEW YORK.

IMPROVEMENT IN DIVIDERS FOR HARVESTING-MACHINES.

Specification forming part of Letters Patent No. 37,995, dated March 24, 1863.

*To all whom it may concern:*

Be it known that I, W. A. WOOD, of Hoosick Falls, in the county of Rensselaer and State of New York, have invented certain new and useful Improvements in an Outside Shoe or Divider for the Cutting Apparatus of a Harvesting-Machine; and I do hereby declare the following to be a full, clear, and exact description thereof, reference being had to the accompanying drawings, making a part of this specification, in which—

Figure 1 represents a side view of the shoe or divider, and Fig. 2 represents a top plan thereof.

This shoe or divider is designed, mainly, to be used in connection with a cutting apparatus patented to me on the 2d day of December, 1862, but may be used elsewhere where an open shoe of its character would be desirable. Its object is to prevent cut or dead grass or "mouse-nests" from clinging and clogging therein; and the invention consists in the enlarged open space behind and over the end of the finger-bar, in connection with the steel cap and open spring-point and shearing-plate, so that the sickle, vibrating through said open point, may cut up and carry out any and all clogging matter of the character mentioned that may hang thereon, and be free to drop out over or behind the end of the finger-bar.

To enable others skilled in the art to make and use my invention, I will proceed to describe the same with reference to the drawings.

A represents the shoe or divider, it being made, mainly, of cast-iron. The portion B is made of steel and riveted onto the shoe at *a*, and extends forward to the point *b*, where it tapers off to quite a sharp point, and is unconnected to the portion *c* underneath it. On the portion *c* of the shoe which is widened out at its rear, but which also tapers off to a point at *b*, may be placed a steel plate, *d*, for the cutter to work on and against, said cutter extending to the point *b*, so as to shear up any grass that may cling thereto, particularly dead grass, which is more apt to hang thereon. The sole of the shoe is narrowed down, so as to occupy but a very narrow strip in moving over the ground. The finger-bar occupies the position shown in red lines in Fig. 1, and has a groove, *e*, formed in it for the cutter-bar to work in. Over this finger-bar, as well as in rear of it, there is a large open space to allow any grass that may get in there to fall out and not hang. There should be spring or elasticity enough in the cap-piece B to yield to such undue pressure at the point as may sometimes occur should the cutter fail to cut up and carry out the dead grass.

A track-clearer may be attached at *f* by a screw-bolt, *g*, so that it (the track-clearer) may raise up or descend at its rear as it passes over inequalities in or on the surface of the ground. The point of the cutter extends out to or near the points *b* of the shoe or divider.

Having thus fully described my invention, what I claim as new, and desire to secure by Letters Patent, is—

An outside shoe or divider having an enlarged open space over and behind the finger-bar, to which it is fastened, and the upper and under portions of whose front approach each other near enough for the cutter to pass through without being united, substantially as and for the purpose herein described.

W. A. WOOD.

Witnesses:
  C. E. PETERS,
  LEN. KING.